US010560018B2

(12) United States Patent
Unterrieder et al.

(10) Patent No.: US 10,560,018 B2
(45) Date of Patent: Feb. 11, 2020

(54) MODULATED POWER SUPPLY

(71) Applicants: Infineon Technologies AG, Neubiberg (DE); pmdtechnologies ag, Siegen (DE)

(72) Inventors: Christoph Unterrieder, Rothenthurn (AT); Franz Michael Darrer, Graz (AT); Stefano Marsili, Faak am See (AT)

(73) Assignees: Infineon Technologies AG (DE); pmdtechnotogies ag (DE)

( * ) Notice: Subject to any disclaimer, the term of this patent is extended or adjusted under 35 U.S.C. 154(b) by 279 days.

(21) Appl. No.: 15/668,213

(22) Filed: Aug. 3, 2017

(65) Prior Publication Data

US 2018/0041115 A1 Feb. 8, 2018

(30) Foreign Application Priority Data

Aug. 8, 2016 (DE) .......................... 10 2016 114 675

(51) Int. Cl.
*H02M 3/137* (2006.01)
*G01S 7/484* (2006.01)
*H05B 33/08* (2020.01)

(52) U.S. Cl.
CPC ............. *H02M 3/137* (2013.01); *G01S 7/484* (2013.01); *H05B 33/0845* (2013.01)

(58) Field of Classification Search
CPC ...... H02M 3/137; H02M 3/156; H02M 3/157; H02M 3/158; H02M 2003/1552; H05B 33/0815; H05B 33/0845; G01S 7/484
See application file for complete search history.

(56) References Cited

U.S. PATENT DOCUMENTS

| 5,736,881 | A  | * | 4/1998 | Ortiz | ....................... | H01S 5/042 323/269 |
| 6,320,330 | B1 | * | 11/2001 | Haavisto | ............ | H05B 33/0818 315/209 R |
| 7,180,921 | B2 | * | 2/2007 | Mangano | .............. | H01S 5/0428 372/38.01 |
| 7,425,803 | B2 | * | 9/2008 | Shao | .................. | H05B 33/0815 315/291 |
| 7,609,532 | B1 | * | 10/2009 | Schutten | ........... | H02M 7/53871 363/132 |
| 9,185,762 | B2 |   | 11/2015 | Mark et al. | | |
| 2003/0099024 | A1 |   | 5/2003 | Lee | | |
| 2007/0182347 | A1 | * | 8/2007 | Shteynberg | ........ | H05B 33/0815 315/312 |

(Continued)

FOREIGN PATENT DOCUMENTS

AT          515 160 A1      6/2015
GB         2 492 833 A      1/2013

OTHER PUBLICATIONS

Infineon, "Multitopology High Power LED DC/DC Controller for Industrial Applications", ILD 1151, Datasheet, Rev. 1.1, Apr. 11, 2012, pp. 1-42.

*Primary Examiner* — Adolf D Berhane
(74) *Attorney, Agent, or Firm* — Design IP (57) ABSTRACT

Devices and methods are provided related to modulated power supplies. The device includes an inductor. When a load is to be supplied with power, a terminal of the inductor is coupled to the load. When the load is not to be supplied with power, terminals of the inductor may be coupled with each other.

29 Claims, 4 Drawing Sheets

(56) References Cited

U.S. PATENT DOCUMENTS

| | | | |
|---|---|---|---|
| 2009/0167260 A1* | 7/2009 | Pauritsch | H02J 7/0065 |
| | | | 323/233 |
| 2010/0039080 A1* | 2/2010 | Schoenbauer | H02M 3/1582 |
| | | | 323/234 |
| 2010/0244737 A1 | 9/2010 | Madhani et al. | |
| 2011/0279060 A1* | 11/2011 | Wang | H02M 3/156 |
| | | | 315/297 |
| 2012/0169240 A1* | 7/2012 | Macfarlane | H02M 1/4225 |
| | | | 315/152 |
| 2012/0189028 A1* | 7/2012 | Hoffman | H01S 5/0428 |
| | | | 372/38.07 |
| 2013/0257279 A1* | 10/2013 | Le | H05B 33/0812 |
| | | | 315/113 |
| 2014/0021882 A1* | 1/2014 | Suenaga | G05F 3/08 |
| | | | 315/210 |
| 2014/0084810 A1 | 3/2014 | Bette et al. | |
| 2014/0312233 A1 | 10/2014 | Mark et al. | |
| 2015/0308949 A1 | 10/2015 | Sadhu et al. | |
| 2016/0366741 A1* | 12/2016 | Yagi | H05B 33/0815 |

* cited by examiner

MODULATED POWER SUPPLY

FIELD

The present application relates to a modulated power supply which may be used to supply a load with modulated power and corresponding methods.

BACKGROUND

Some applications require a load to be supplied with modulated power. For example, a light source like a light emitting diode (LED) or a laser diode may be supplied with modulated power, which causes the light source to emit a modulated light signal.

One example application for such modulated power supplies supplying a light source are Time-of-Flight (ToF) sensors. Such sensors emit a modulated light signal which is reflected by a nearby object towards an image sensor comprising a matrix of photon mixing devices (PMDs) that resolve the object in real time. Each PMD in the matrix measures a distance to a point on the nearby object by determining a phase shift between the emitted light signal and the reflected light signal. The information gathered across the matrix from all PMDs may be used for applications like automobile crash detection systems, 3-dimensional imaging, video game interfaces or robotics, but are not limited thereto.

For modern Time-of-Flight sensors, modulation frequencies in the MHz region are used for generating the modulated light signals. Therefore, corresponding modulated power supplies are needed which supply one or more light sources used with modulated power.

In one approach, a direct current/direct current (DC/DC) converter is used to provide a suitable input voltage (for example based on a battery voltage) to a desired operating voltage. A modulation switch is provided to enable or disable current flow through a light source like a light emitting diode (LED). A blocking capacitor is furthermore provided for decoupling during switching. Additionally, a resistor is used for current limiting. While such a conventional approach has a simple structure, it requires a comparatively large area for a blocking capacitor, and the power efficiency is comparatively low due to the current limiting resistor. Moreover, the turn-off time of the light emitter may be comparatively high.

In another approach, instead of providing a modulation switch coupled directly to the light emitting diode, a modulation switch is coupled to a node between a DC/DC converter and a light source with one terminal and to ground with another terminal. When this switch is turned on, it shunts the current to ground thus turning the light emitting diode off. This approach may reduce turn-off time by reverse biasing of the light source. On the other hand, comparatively high power losses may result.

Another approach combines the approaches mentioned above, by providing for example a first modulation switch between an anode of a light emitting diode used as light source and ground and a second modulation switch between the cathode of the light emitting diode and ground, the anode being coupled with a DC/DC converter.

It may be desirable to provide further possibilities for modulated power supplies, in particular for use for supplying light sources, for example, in Time-of-Flight sensors.

SUMMARY

Various apparatuses and methods directed to a modulated power supply and corresponding methods thereof, and may be further directed to one or more Time-of-Flight (TOF) sensors that include such a device.

According to an example embodiment, a device is provided that includes a direct current/direct current-converter including an inductor and a load output; and a controller. The controller is configured to control the direct current/direct current-converter in a first phase of operation where a load is not be supplied with power to couple a first terminal of the inductor to a second terminal of the inductor via a path outside the inductor, and to control the direct current/direct current-converter in a second phase where the load is to be supplied with power to couple the second terminal of the inductor to the output.

According to another example embodiment, a device is provided that includes a first supply voltage input; a second supply voltage input; an inductor including a first terminal and a second terminal; a first switch coupled between the first supply voltage input and the first terminal; a second switch coupled between the second supply voltage input and the first terminal; a third switch coupled between the second terminal and the first supply voltage; and a fourth switch coupled between the second terminal and a load output terminal.

According to yet another example embodiment, a method is provided that includes coupling first and second terminals of a conductor with each other via a path outside the inductor in a first phase of operation of a modulated power supply; and coupling the second terminal of the inductor to a load in a second phase of operation of the modulated power supply.

According to yet another example embodiment, a device includes an inductor. When a load is to be supplied with power, a terminal of the inductor is coupled to the load. When the load is not to be supplied with power, terminals of the inductor may be coupled with each other.

The above summary is merely intended to provide a brief overview over some aspects of some embodiments. In other embodiments, other features may be provided.

DETAILED DESCRIPTION

In the following, various embodiments will be described in detail referring to the attached drawings. These embodiments are given by way of example only and are not to be construed as limiting. For example, while embodiments may be described as comprising a plurality of features or elements, in other embodiments some of these features or elements may be omitted, and/or may be replaced by alternative features or elements. Features of different embodiments may be combined to form further embodiments unless noted otherwise. Variations, modifications or details described with respect to one of the embodiments may also be applicable to other embodiments.

In the embodiments, any direct electrical connection or coupling between components or circuit elements, i.e. connection or coupling without intervening elements, may also be implemented by an indirect connection or coupling, i.e. a connection or coupling comprising one or more additional intervening elements, as long as the general purpose of the connection or coupling, for example to transmit a certain kind of signal, to transmit a certain kind of information or to provide a certain kind of control, is essentially maintained. Apart from the features or elements explicitly shown in the drawings or described herein, further features or elements, for example features or elements conventionally used in modulated power supplies or in Time-of-Flight sensors, may be provided.

In embodiments, modulated power supplies based on a DC/DC converter like a buck converter or a buck-boost converter without an output capacitor are used. In a phase of controlling switches of the modulated power supply, a first terminal and a second terminal of an inductor may be coupled together via a path outside the inductor (i.e. in addition to the coupling via the inductor itself) and may be coupled to a supply voltage. In other words, in embodiments an inductor may be short circuited during part of the operation of the modulated power supply.

Figure 1:
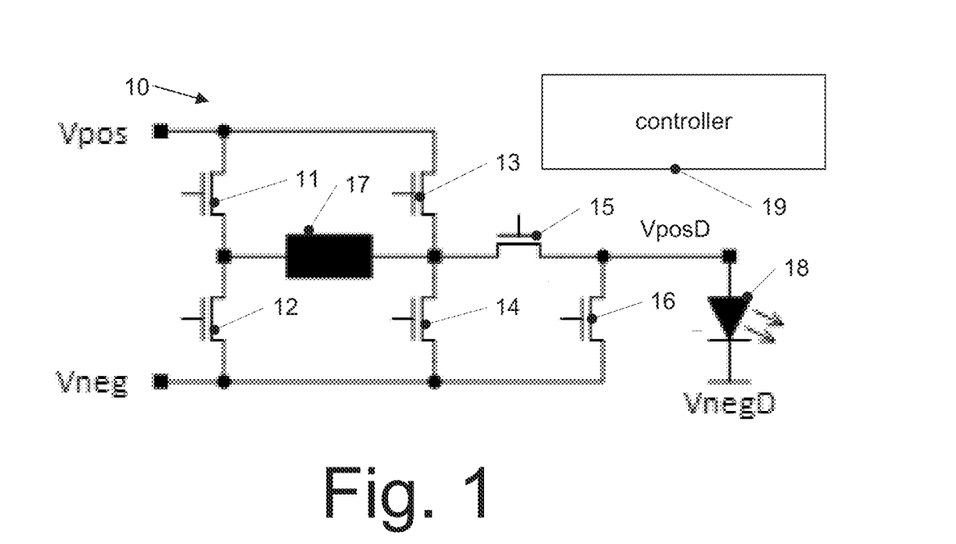
FIG. 1 is a circuit diagram illustrating a device according to one or more embodiments.

FIG. 1 is a circuit diagram of a device 10 according to an embodiment comprising a modulated power supply (elements 11 to 17 described further below) for supplying a light source 18 with modulated power controlled by a controller 19. Controller 19 may be any kind of suitable controller and may for example comprise a microcontroller, an ASIC, a computer or any other suitable circuit to control switches of device 10 to provide a desired modulation to light source 18. Light source 18 may comprise a light emitting diode (LED) or a laser diode, or a plurality thereof, for example one or more vertical cavity surface emitting lasers (VCSEL).

The device of FIG. 1 comprises switches 11 to 16. Switches 11 to 16 may for example be implemented as transistor-based switches, for example NMOS (N-Metal Oxide Semiconductor) or PMOS (P-Metal Oxide Semiconductor) field effect transistor based switches or NPN/PNP bipolar transistor based switches with associated drivers controlled by controller 19. In other words, controller 19 controls on/off-states of the switches.

It should be noted that in the embodiment of FIG. 1 switches 14 and 16 are redundant, and in other embodiments one or both of these switches may be omitted. By providing both switches, redundant safety features for example for overvoltage protection by short circuiting an overvoltage to ground may be provided. For example, such redundant switches may in normal operation have a fixed state, for example an open (non-conducting) state or, depending on the arrangement of the transistor, also a closed (conducting) state. In other embodiments, redundant switches may also be used to accelerate switching. For example, in the embodiment of FIG. 1, switch 14 may be open in normal operation. However, in some embodiments, switch 14 may be closed at times to compensate losses. Furthermore, in some embodiments one of switches 11 or 12 may be replaced by a diode, for example an external diode, while the remaining components 11 to 17 may be integrated on an integrated circuit.

In FIG. 1, Vpos designates a positive supply voltage, and Vneg designates a negative supply voltage, i.e. external supply voltages based on which the power supply of device 10 generates a supply voltage for light source 18. VposD designates a positive supply voltage supplied to light source 18 by the power supply, and VnegD designates a negative supply voltage of the diode. In the embodiment of FIG. 1, VnegD may be coupled to Vneg, for example directly or via networks like an RC network.

The device of FIG. 1 furthermore comprises an inductor 17 coupled with a first terminal thereof to a node between switches 11 and 12 and with a second terminal thereof to a node between switches 13 and 14.

In a phase where current is to be supplied to light source 18, switch 15 is closed and switch 13 is opened. VposD is generated by alternatingly coupling inductor 17 with Vpos by closing switch 11 and Vneg by closing switch 12, corresponding to the operation principle of a conventional buck converter.

In a state where light source 18 is not to be supplied with power, switch 15 is opened and switch 13 is closed. Thereby, the second terminal of inductor 17 is coupled to Vpos. In case switch 11 is also closed, this couples both terminals of inductors 17 with Vpos in such certain phase of operation. Effectively, this short-circuits inductor 17, which may reuse or preserve energy stored in inductor 17 while no current is to be supplied to light source 18. Compared to that, in conventional solutions current during an off-state of light source 18 is typically put out ("sourced") to ground or a negative supply voltage.

In other words, closing switches 11 and 13 during this phase of operation when no current is to be supplied to light source 18, the magnetic field of inductor 17 only slowly decreases due to ohmic losses in inductor 17 and in switches 11 and 13.

Figure 2:
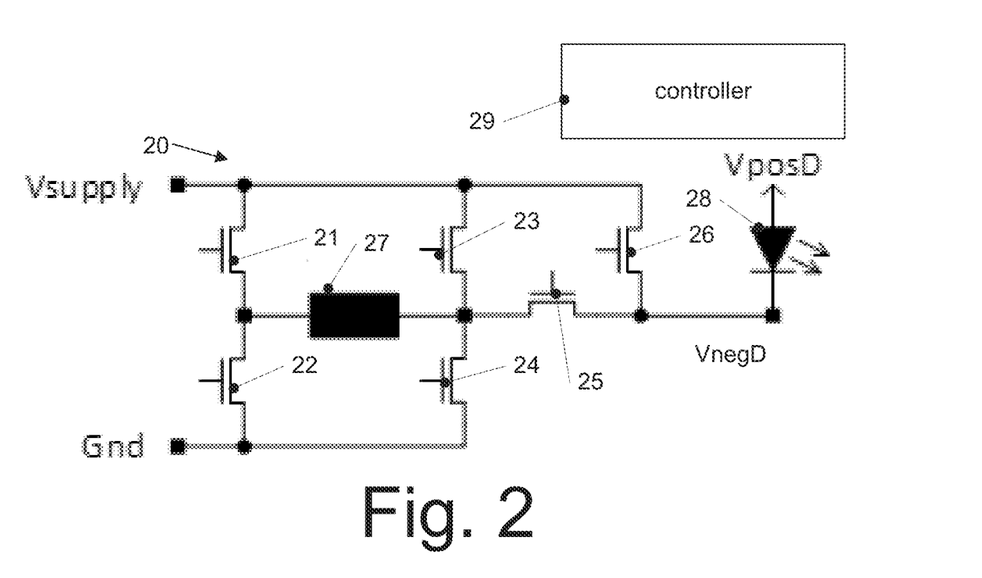
FIG. 2 is a circuit diagram illustrating a device according to one or more embodiments.

FIG. 2 illustrates a device 20 according to an embodiment, which is essentially an inverted version of the embodiment of FIG. 1. In particular, in the embodiment of FIG. 2 a light source 28 is supplied by a negative supply voltage VnegD via a DC/DC converter comprising switches 21 to 26 and an inductor 27 and being controlled by controller 29. The power supply receives a supply voltage Vsupply and is also coupled to ground GND. Switches 21 to 26 as mentioned above may be implemented as transistor switches.

Furthermore, controller 29 may be implemented as already explained for controller 19, and light source 28 may be implemented as explained for light source 18 of FIG. 1.

In the embodiment of FIG. 2, switches 23, 26 are redundant and one of switches 23, 26 or both may be omitted. In some embodiments, switch 23 may be open in normal operation. In some embodiments, switch 23 may be closed at times to compensate losses. Furthermore, one of switches 21, 22 may be replaced by a diode in some embodiments.

When power is to be supplied to light source 28, switch 24 is opened and switch 25 is closed. Switches 21, 22 are selectively coupled to inductor 27 such that light source 28 is supplied with voltage VnegD.

Furthermore, when no power is to be supplied to light source 28, switch 25 is opened and switch 24 is closed. When switch 22 is also closed, this short circuits first and second terminals of inductor 27, leading to effects as described already with respect to FIG. 1.

Controller 19 or 29 then, to provide modulated light output from light source 18 or 28, respectively, controls switches 13, 15 of FIG. 1 or switches 24, 25 of FIG. 2, respectively, to selectively supply light source 18 or 28 with power according to a desired modulation scheme for a particular application, for example for Time-of-Flight measurements. It should be noted that in the embodiments of FIGS. 1 and 2, no output capacitors are required.

Figure 3:
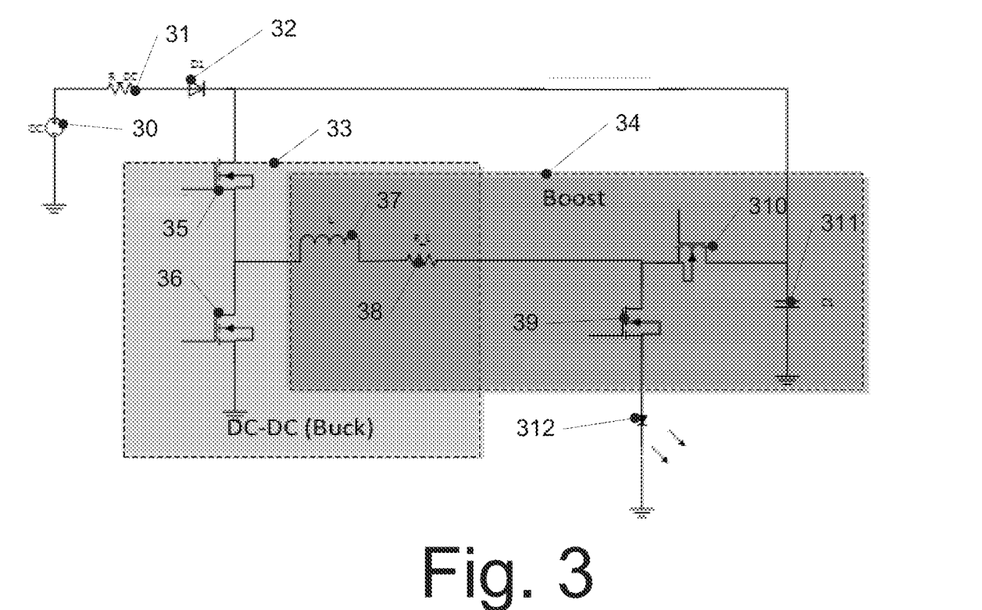
FIG. 3 is a circuit diagram illustrating a device according to one or more embodiments, which is used for simulations.

FIG. 3 illustrates a circuit diagram used for simulations explained later, which is based on the embodiment of FIG. 1. Therefore, for better understanding FIG. 3 will be explained referring to FIG. 1.

In FIG. 3, 33 generally designates a buck part of a DC/DC converter, and 34 designates a boost part.

Buck part 33 is supplied by an external supply voltage 30, for example a battery. Numeral 31 designates an intrinsic resistance of voltage source 30. The coupling may be via a diode 32, which is optional and may be used in some embodiments to avoid current flowing back into voltage source 30. Buck part 33 furthermore comprises a first switch 35 and a second switch 36 each implemented as a field effect transistor. Switches 35, 36 regarding their function correspond to switches 11, 12 of FIG. 1 and serve to selectively couple an inductor 37 with voltage source 30 by closing switch 35 and opening switch 36 or with ground by closing switch 36 and opening switch 35.

Numeral 38 designates an intrinsic resistance of inductor 37, i.e. a parasitic resistance, while inductor 37 represents an ideal inductor without ohmic resistance for purpose of simulation. A switch 39 couples inductor 37 to a light emitting diode 312 to be supplied. A switch 310 serves to short circuit inductor 37 via a path outside inductor 37 when no power is to be supplied to light emitting diode 312. 311 denotes a capacitance to ground, which may be a parasitic capacitance.

Switch 39 of FIG. 3 essentially serves the same function as switch 15 of FIG. 1, and switch 310 has essentially the same function as switch 13 of FIG. 1. It should be noted that in the embodiment FIG. 3, no switches corresponding to switches 14 and 16 of FIG. 1 have been provided. In other embodiments, such switches may also be provided for the circuit of FIG. 3.

In operation, when light emitting diode 312 is to be supplied with power, switch 39 is closed and switch 310 is open. Switches 35 and 36 are operated as in a conventional buck converter to provide a desired voltage to light emitting diode 312.

When light emitting diode 312 is not to be supplied with power, switch 39 is opened and switch 310 is closed. At times when switch 35 is then also closed, terminals of load 37 are essentially short circuited, leading to a remaining magnetic field which decays only slowly due to parasitic resistance 38. With high modulation frequencies in the MHz range, most of the magnetic field may be "preserved" until light emitting diode 312 is to be supplied with power again.

Next, with reference to FIGS. 4 to 7, simulation results for the circuit of FIG. 3 will be discussed.

Figure 4:
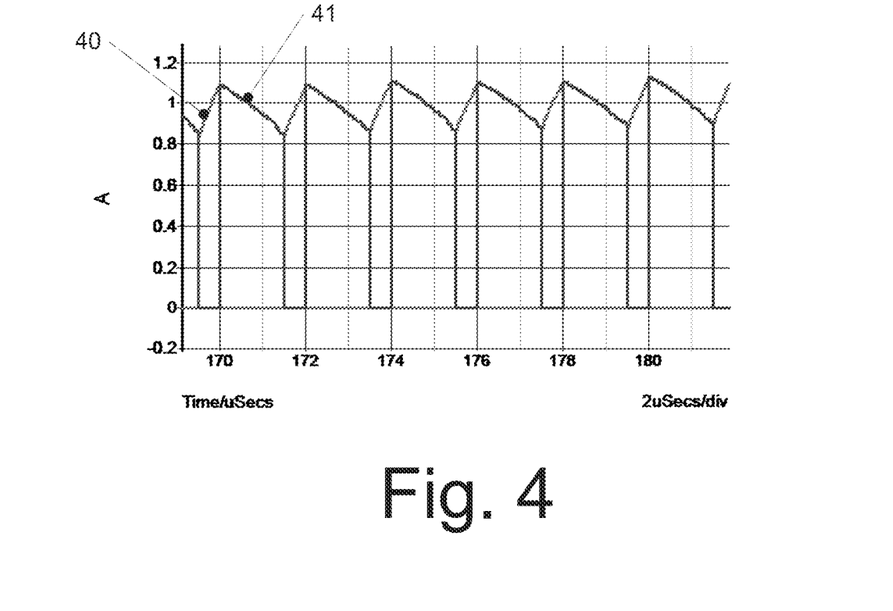
FIGS. 4 to 7 illustrate simulation results according to one or more embodiments.
Figure 5:
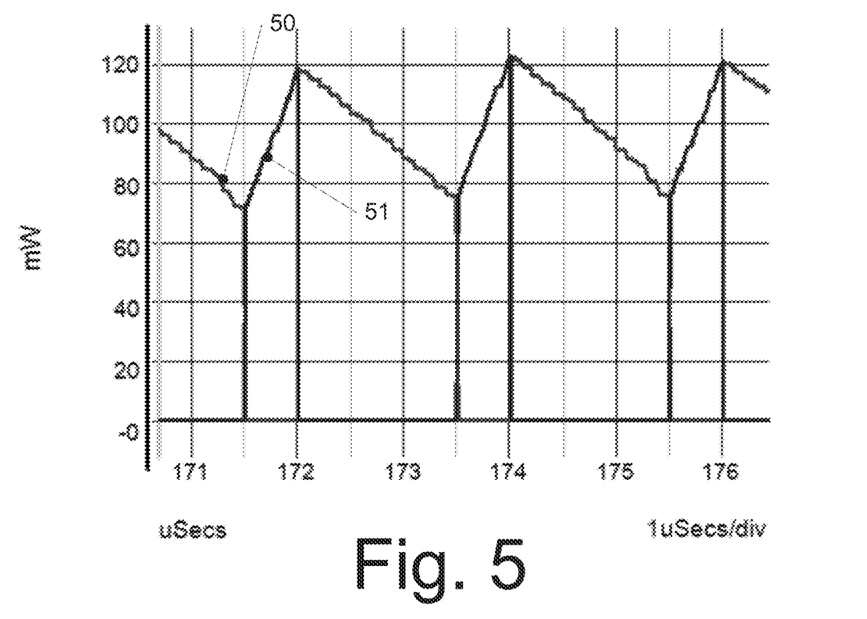

FIGS. 4 and 5 illustrate a simulation for a modulation frequency of 500 kHz. FIG. 4 illustrates a current in Ampere through switches 310, 39 of FIG. 3. In particular, a curve 40 illustrates the current through switch 39, and a curve 41 illustrates the current through switch 310. As can be seen, in curve 41 the current slowly decays due to resistor 38. For this simulation, a resistance of 0.1Ω was taken as on-resistance of switches 39, 310.

FIG. 5 illustrates the power consumption for the case of FIG. 4, i.e. a modulation frequency of 500 kHz. A curve 50 illustrates power consumption through switch 39, and a curve 51 illustrates power consumption through switch 310. The average power consumption is about 100 mW in this case.

Figure 6:
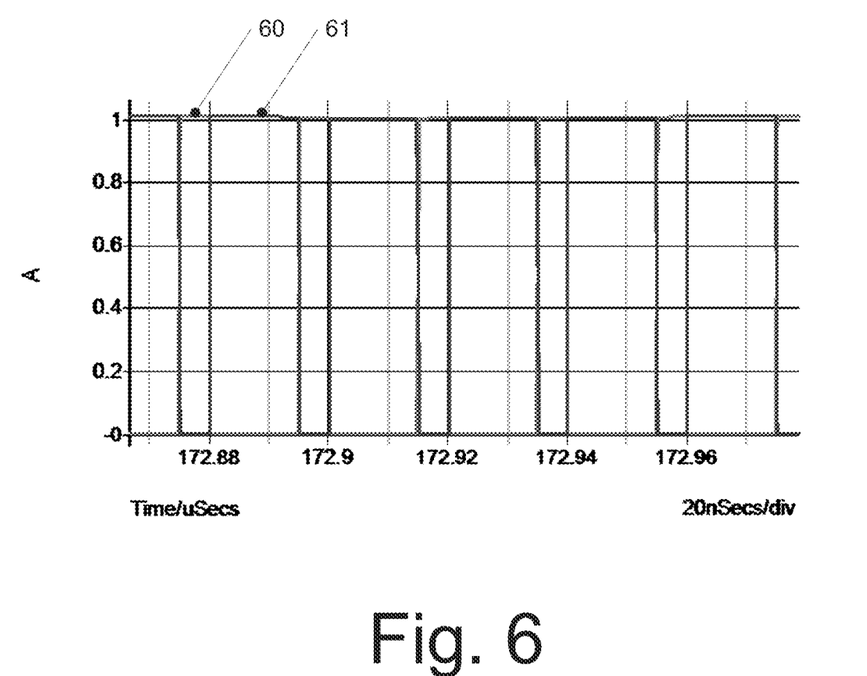
Figure 7:
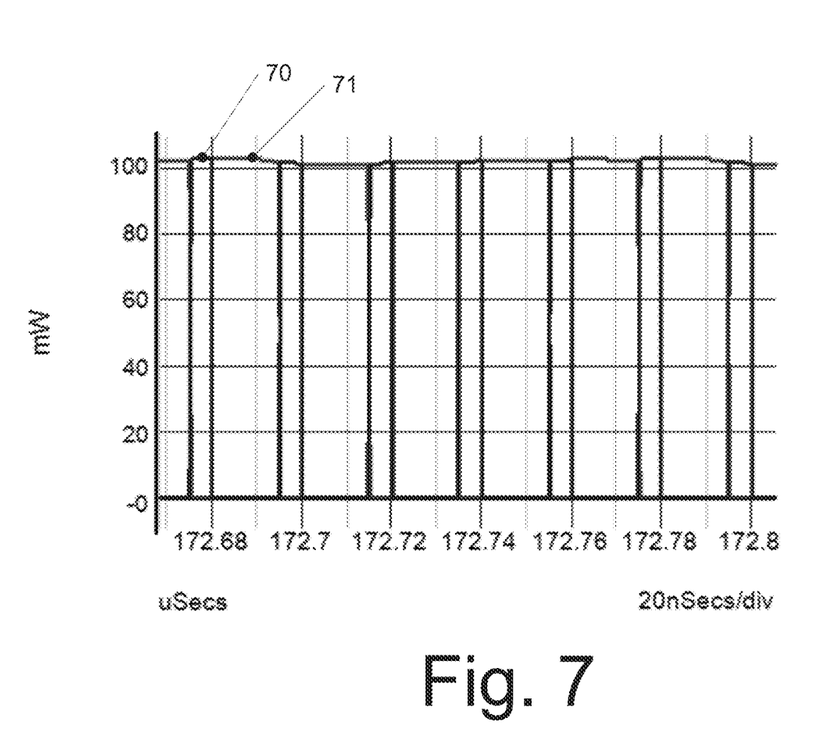

FIGS. 6 and 7 show corresponding simulations for a modulation frequency of 50 MHz. FIG. 6 shows a representation of the current flowing through the switches corresponding to the situation of FIG. 5, with a curve 60 illustrating current through switch 39, and a curve 61 illustrating the current through switch 310. As can be seen, the overall current stays approximately constant with such high frequencies.

FIG. 7 illustrates the power consumption for the modulation frequency of 50 MHz. A curve 70 shows the power consumption at switch 310, and a curve 71 shows the power consumption at switch 39. Also in this case, the average power consumption is about 100 mW. Therefore, even when the frequency increases, power consumption does not increase significantly. In contrast thereto, in some conventional approaches power consumption rises significantly when going to high frequencies of above 1 MHz, e.g. above 10 MHz, for example 50 MHz, such that for example for such a high frequency implementations as described above may result in a power saving. Nevertheless, embodiments may also be used at lower frequencies.

Figure 8:
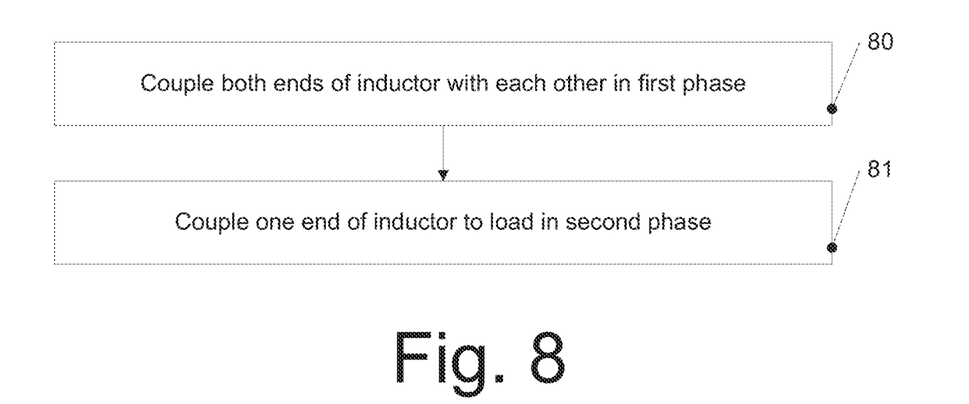
FIG. 8 is a flow chart illustrating a method according to one or more embodiments.

FIG. 8 illustrates a flow chart of a method according to an embodiment. The method of FIG. 8 may be implemented using any of the embodiments discussed previously, but may also be implemented independently therefrom. For ease of explanation, when explaining the method of FIG. 8 reference will be made to the embodiments previously discussed, which is not to be construed as limiting.

At 80 in FIG. 8, in a first phase where a load is not to be supplied with power, both ends, i.e. both terminals, of an inductor of a power supply are coupled with each other by closing a first switch. For example, in case of FIG. 1 first switch may be switch 13, in case of FIG. 2 first switch may be switch 23 and in case of FIG. 3 first switch may be switch 310.

At 81, in a second phase where a load is to be supplied with power, one end of the inductor is coupled to the load via a second switch (for example switch 15 of FIG. 1, switch 25 of FIG. 2 or switch 39 of FIG. 3). The phases may be repeated for providing a modulation, and the order of the phases depicted in FIG. 8 is not to be construed as limiting. Furthermore, there may also be a third phase, where for example in FIG. 1 switch 15 is open and switch 13 is closed, but switch 11 is open and switch 12 is closed. This third phase may alternate with the first phase at 80 a plurality of times before transitioning to the second phase at 81 in some embodiments. Therefore, the fact that the method of FIG. 8 is represented as comprising two phases is not to be construed as limiting the method to two phases only, and more phases may be present, and various orders of such phases are possible.

In view of the modifications and variations discussed above, it is evident that the described embodiments are not to be construed as limiting, but serve as examples only.

According to some embodiments, the following examples are provided:

Example 1

A device includes a direct current/direct current-converter including an inductor and a load output, and a controller. The controller is configured to control the direct current/direct current-converter in a first phase of operation where a load is not be supplied with power to couple a first terminal of the inductor to a second terminal of the inductor via a path outside the inductor, and to control the direct current/direct current-converter in a second phase where the load is to be supplied with power to couple the second terminal of the inductor to the output.

Example 2

According to the device of example 1, the controller is further configured to control the direct current/direct current-converter to decouple the second terminal of the load from the output in the first phase, and to open the path outside the inductor in the second phase.

Example 3

According to the device of any one of examples 1 and 2, the controller is further configured to alternatingly couple the first output terminal of the inductor to a first supply voltage or to a second supply voltage different from the first supply voltage.

Example 4

According to the device of any one of examples 1-3, the direct current/direct current-converter is one of a buck converter or a buck boost converter.

Example 5

A device includes a first supply voltage input, a second supply voltage input, an inductor comprising a first terminal and a second terminal, a first switch coupled between the first supply voltage input and the first terminal, a second switch coupled between the second supply voltage input and the first terminal, a third switch coupled between the second terminal and the first supply voltage, and a fourth switch coupled between the second terminal and a load output terminal.

Example 6

According to the device of example 5, the first supply voltage is a positive supply voltage, and the second supply voltage is a negative supply voltage.

Example 7

According to the device of example 5, the second supply voltage is a positive supply voltage, and the first supply voltage is ground or a negative supply voltage.

Example 8

According to the device of any one of examples 5-7, a modulation controller is further provided, where the modulation controller is configured to close the fourth switch and open the second switch when a load coupled to the output terminal is to be supplied with power, and to close the third switch and open the fourth switch when the load is not to be supplied with power.

Example 9

According to the device of any one of examples 5-8, a fifth switch is provided, where the firth switch is coupled between a node between the second terminal of the load and the fourth switch and the second supply voltage.

Example 10

According to the device of any one of examples 5-9, a sixth switch is provided, where the sixth switch is coupled between a node between the fourth switch and the output terminal and the second supply voltage.

Example 11

According to the device of any one of examples 9 and 10, at least one of the fifth switch or the sixth switch has a fixed state during normal operation of the device.

Example 12

According to the device of any one of examples 9-11, at least one of the fifth switch or the sixth switch is configured to change its state in response to an overvoltage or an overcurrent.

Example 13

According to the device of any one of examples 1-12, the load coupled to the output terminal is provided.

Example 14

According to the device of example 13, the load includes a light source.

Example 15

A Time-of-Flight sensor that includes the device of any one of examples 1-13.

Example 16

A method includes coupling first and second terminals of a conductor with each other via a path outside the inductor in a first phase of operation of a modulated power supply, and coupling the second terminal of the inductor to a load in a second phase of operation of the modulated power supply.

Example 17

According to the method of example 16, the method further includes supplying the load with power in the second phase, while not supplying the load with power in the first phase.

Example 18

According to the method of example 16, the method further includes alternatingly coupling the first terminal of the inductor with a first supply voltage or with a second supply voltage.

Example 19

According to the method of any one of examples 16-18, the method further includes switching between the first phase and the second phase with a frequency above 1 MHz.

Example 20

According to the method of example 19, the frequency is above 10 MHz.

What is claimed is:
1. A device, comprising:
   a direct current/direct current-converter comprising an inductor and a load output; and a controller, wherein the controller is configured to control the direct current/direct current-converter in a first phase of operation where a load is not to be supplied with power to couple a first terminal of the inductor to a second terminal of the inductor via a circuit path external to the inductor, and to control the direct current/direct current-converter in a second phase where the load is to be supplied with power to couple the second terminal of the inductor to the output.

2. The device of claim 1, wherein the controller is further configured to control the direct current/direct current-converter to decouple the second terminal of the load from the output in the first phase, and to open the path outside the inductor in the second phase.

3. The device of claim 1, wherein the controller is further configured to alternatingly couple the first output terminal of the inductor to a first supply voltage or to a second supply voltage different from the first supply voltage.

4. The device of claim 1, wherein the direct current/direct current-converter comprises one of a buck converter or a buck boost converter.

5. The device of claim 1, further comprising the load coupled to the output terminal.

6. The device of claim 5, wherein the load comprises a light source.

7. A device, comprising:
a first supply voltage input;
a second supply voltage input;
an inductor comprising a first terminal and a second terminal;
a first switch coupled between the first supply voltage input and the first terminal;
a second switch coupled between the second supply voltage input and the first terminal;
a third switch coupled between the second terminal and the first supply voltage; and
a fourth switch coupled between the second terminal and a load output terminal.

8. The device of claim 7, wherein the first supply voltage is a positive supply voltage, and the second supply voltage is a negative supply voltage.

9. The device of claim 7, wherein the second supply voltage is a positive supply voltage, and wherein the first supply voltage is ground or a negative supply voltage.

10. The device of claim 7, further comprising:
a modulation controller, wherein the modulation controller is configured to close the fourth switch and open the third switch when a load coupled to the load output terminal is to be supplied with power, and to close the third switch and open the fourth switch when the load is not to be supplied with power.

11. The device of claim 7, further comprising:
a fifth switch coupled between a node between the second terminal of the load and the fourth switch and the second supply voltage.

12. The device of claim 11, wherein the fifth switch has a fixed state during normal operation of the device.

13. The device of claim 11, wherein the fifth switch is configured to change its state in response to an overvoltage or an overcurrent.

14. The device of claim 11, further comprising:
a sixth switch coupled between a node between the fourth switch and the output terminal and the second supply voltage.

15. The device of claim 14, wherein the sixth switch has a fixed state during normal operation of the device.

16. The device of claim 14, wherein the sixth switch is configured to change its state in response to an overvoltage or an overcurrent.

17. The device of claim 7, wherein the device is incorporated in a Time-of-Flight sensor.

18. A method, comprising:
coupling first and second terminals of an inductor with each other via a circuit path external to the inductor in a first phase of operation of a modulated power supply, and
coupling the second terminal of the inductor to a load in a second phase of operation of the modulated power supply.

19. The method of claim 18, further comprising:
supplying the load with power in the second phase, while not supplying the load with power in the first phase.

20. The method of claim 18, further comprising:
alternatingly coupling the first terminal of the inductor with a first supply voltage or with a second supply voltage.

21. The method of claim 18, further comprising:
switching between the first phase and the second phase with a frequency above 1 MHz.

22. The method of claim 21, wherein the frequency is above 10 MHz.

23. The device of claim 1, wherein the first terminal and the second terminal are short-circuited together via the circuit path during the first phase, and the first terminal and the second terminal are not short-circuited together during the second phase.

24. The device of claim 23, wherein, when the load is to be supplied with power, a first current flows from the first terminal to the second terminal and into the load.

25. The device of claim 24, wherein, when the load is not to be supplied with power, a second current flows through the inductor from the first terminal to the second terminal, and from the second terminal through the circuit path back to the first terminal.

26. The device of claim 7, further comprising:
a modulation controller, wherein the modulation controller is configured to close the fourth switch and open the third switch when a load coupled to the load output terminal is to be supplied with power, and to close the third switch, close the first switch, and open the fourth switch when the load is not to be supplied with power, wherein closing the third switch and closing the first switch couples the first terminal and the second terminal to the first supply voltage input such that the first terminal and the second terminal are short-circuited together.

27. The device of claim 26, wherein, when the load is to be supplied with power, a first current flows from the first terminal to the second terminal and through the fourth switch to the load.

28. The device of claim 27, wherein, when the load is not to be supplied with power, a second current flows through the inductor from the first terminal to the second terminal, from the second terminal through the third switch, and from the third switch through the first switch back to the first terminal.

29. The method of claim 18, wherein:
in the first phase of operation of the modulated power supply, the first and the second terminals of the inductor are coupled with each other via the circuit path such that the inductor is short-circuited, and in the second phase of operation of the modulated power supply, the first and the second terminals of the inductor are not short-circuited together.

\* \* \* \* \*